United States Patent [19]

Tippie

[11] Patent Number: 5,101,529
[45] Date of Patent: Apr. 7, 1992

[54] WINDSHIELD SCRAPER APPARATUS

[76] Inventor: Walter J. Tippie, 1106 W. Osborne St., Sandusky, Ohio 44870

[21] Appl. No.: 675,856

[22] Filed: Mar. 27, 1991

[51] Int. Cl.$^5$ ................................................ B60S 1/04
[52] U.S. Cl. .............................. 15/236.02; 15/236.08
[58] Field of Search ............ 15/236.01, 236.02, 236.08

[56] References Cited

U.S. PATENT DOCUMENTS

| | | | |
|---|---|---|---|
| 2,299,089 | 10/1942 | Haan | 15/236.02 |
| 2,532,429 | 12/1950 | Sparkman | 15/236.02 X |
| 3,036,322 | 5/1962 | Jorgensen | 15/236.08 X |
| 3,133,301 | 5/1964 | Helminen | 15/236.02 X |

FOREIGN PATENT DOCUMENTS 3341529  5/1985  Fed. Rep. of Germany ... 15/236.02

Primary Examiner—Chris K. Moore
Attorney, Agent, or Firm—Leon Gilden

[57] ABSTRACT

An apparatus including a unitary upper housing formed with an upper housing portion coaxially aligned and integral with a lower conical housing, wherein the lower conical housing portion includes a lower annular scraper edge, wherein a serrated scraper blade member may be cumulatively added to the lower scraper annular edge for enhanced scraping of ice and the like formations on automotive windshields. A modification of the invention includes a disk structure formed with mounting bores receiving securement rods, wherein the disk is reversibly mounted relative to the bottom surface of the lower conical housing portion for securement thereto utilizing a continuous scraper edge or a serrated edge.

3 Claims, 4 Drawing Sheets

WINDSHIELD SCRAPER APPARATUS

BACKGROUND OF THE INVENTION

1. Field of the Invention

The field of invention relates to ice scraper apparatus, and more particularly pertains to a new and improved windshield scraper apparatus wherein the same is arranged for removal of ice and snow from automotive windshields and additionally includes an annular continuous or serrated edge providing for enhanced and expeditious removal of snow utilizing a circular shape of cutting edge for enhanced speed of removal of ice and snow from a windshield.

2. Description of the Prior Art

Various ice scraper apparatus is utilized in the automotive environment for removal of ice and snow accumulated thereon to permit visibility during operation of an associated motor vehicle. Such apparatus may be found for example in U.S. Pat. No. 4,468,831 to Schneider wherein an ice scraper utilizes an elongate linear scraper edge mounted within a handle.

U S. Pat. No. 4,870,712 to Markus utilizes an ice scraper linear blade mounted within a sack member to permit securement of a handle within the sack member preventing ice and snow from access to an individual's hand during use of the structure.

U.S. Pat. No. 4,542,554 to Wallerstein sets forth a scraper member wherein the scraper blade is mounted relative to a bottom surface of the scraper handle in a removable manner.

U.S. Pat. No. 4,719,660 to Hopkins sets forth a further example of an ice scraper with a linear scraping edge utilizing a serrated edge in a spaced relationship thereto, wherein both the scraper and linear edges are arranged in a spaced parallel relationship relative to one another.

As such, it may be appreciated that there continues to be a need for a new and improved windshield scraper apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of windshield scraper apparatus now present in the prior art, the present invention provides a windshield scraper apparatus wherein the same utilizes a plurality of selectively utilized circular ice scraping blades of either linear or serrated construction for removal of ice and snow from an associated windshield. As such, the general purpose of the present invention, which will be described subsequently in greater detail, is to provide a new and improved windshield scraper apparatus which has all the advantages of the prior art windshield scraper apparatus and none of the disadvantages.

To attain this, the present invention provides an apparatus including a unitary upper housing formed with an upper housing portion coaxially aligned and integral with a lower conical housing, wherein the lower conical housing portion includes a lower annular scraper edge, wherein a serrated scraper blade member may be cumulatively added to the lower scraper annular edge for enhanced scraping of ice and the like on automotive windshields. A modification of the invention includes a disk structure formed with mounting bores receiving securement rods, wherein the disk is reversibly mounted relative to the bottom surface of the lower conical housing portion for securement thereto utilizing a continuous scraper edge or a serrated edge.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved windshield scraper apparatus which has all the advantages of the prior art windshield scraper apparatus and none of the disadvantages.

It is another object of the present invention to provide a new and improved windshield scraper apparatus which may be easily and efficiently manufactured and marketed.

It is a further object of the present invention to provide a new and improved windshield scraper apparatus which is of a durable and reliable construction.

An even further object of the present invention is to provide a new and improved windshield scraper apparatus which is susceptible of a low cost of manufacture with regard to both materials and labor, and which accordingly is then susceptible of low prices of sale to the consuming public, thereby making such windshield scraper apparatus economically available to the buying public.

Still yet another object of the present invention is to provide a new and improved windshield scraper apparatus which provides in the apparatuses and methods of the prior art some of the advantages thereof, while simultaneously overcoming some of the disadvantages normally associated therewith.

Still another object of the present invention is to provide a new and improved windshield scraper apparatus wherein the same utilizes circular blades for enhanced rapidity and speed of removal of ice and snow from a windshield permitting continuous use of the scraper structure without lifting the scraper blade structure from an associated windshield in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
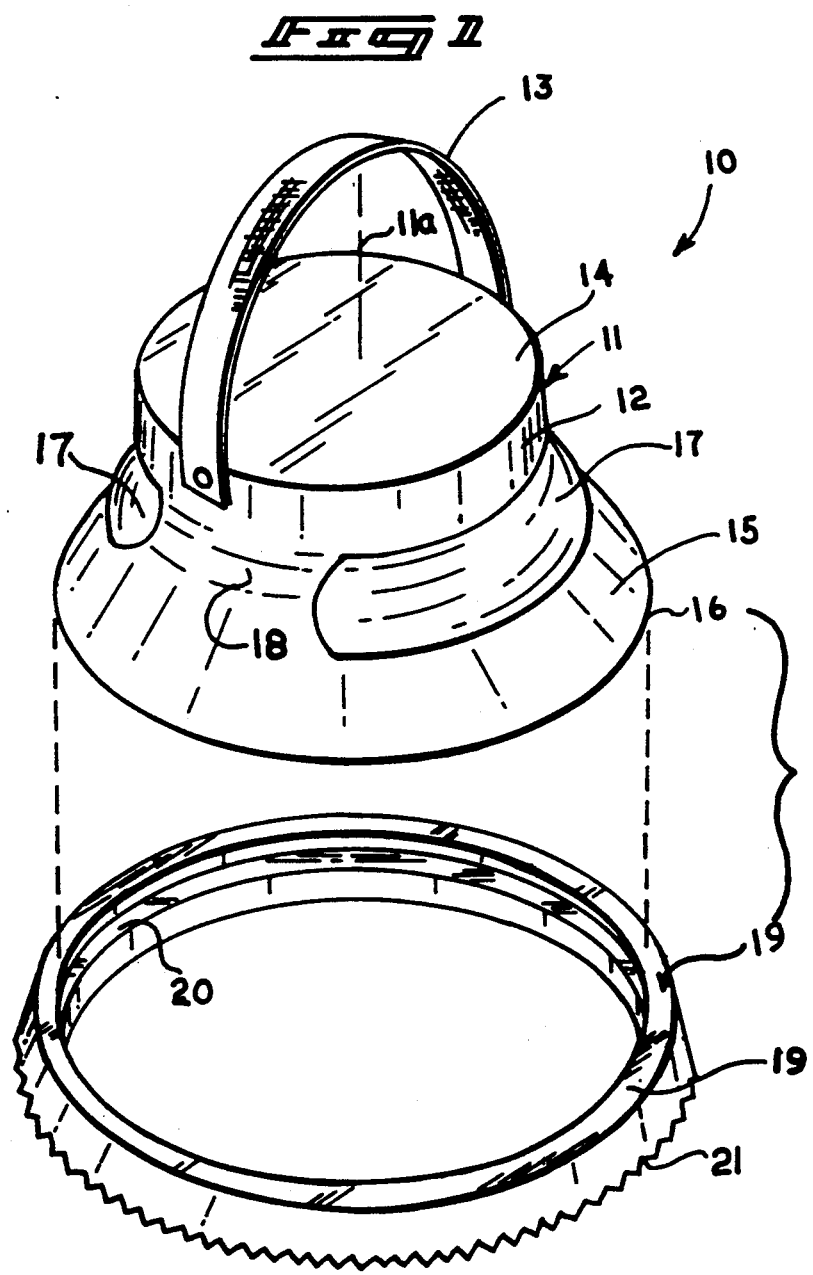
FIG. 1 is an isometric exploded illustration of the instant invention.
Figure 2:
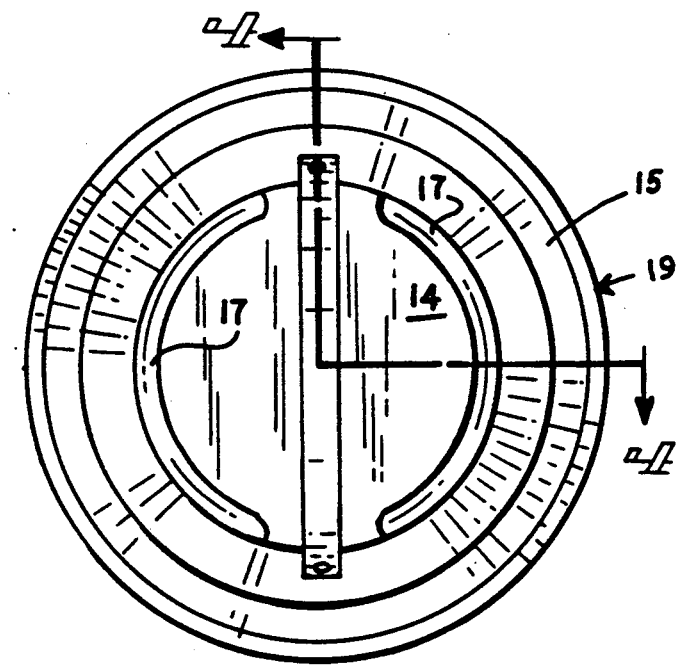
FIG. 2 is an orthographic top view of the instant invention.
Figure 3:
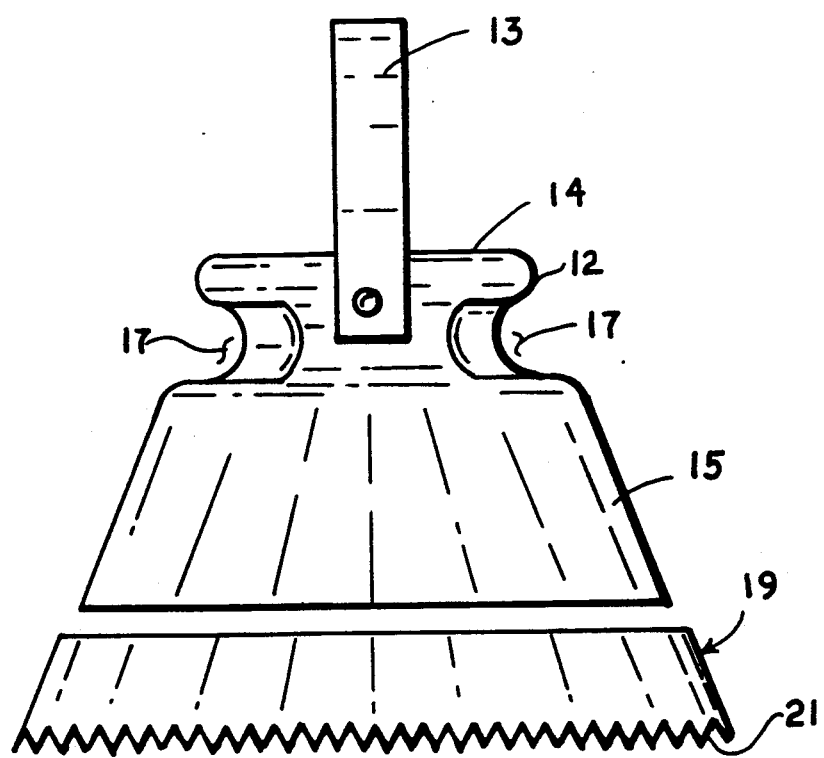
FIG. 3 is an orthographic side view of the instant invention.
Figure 4:
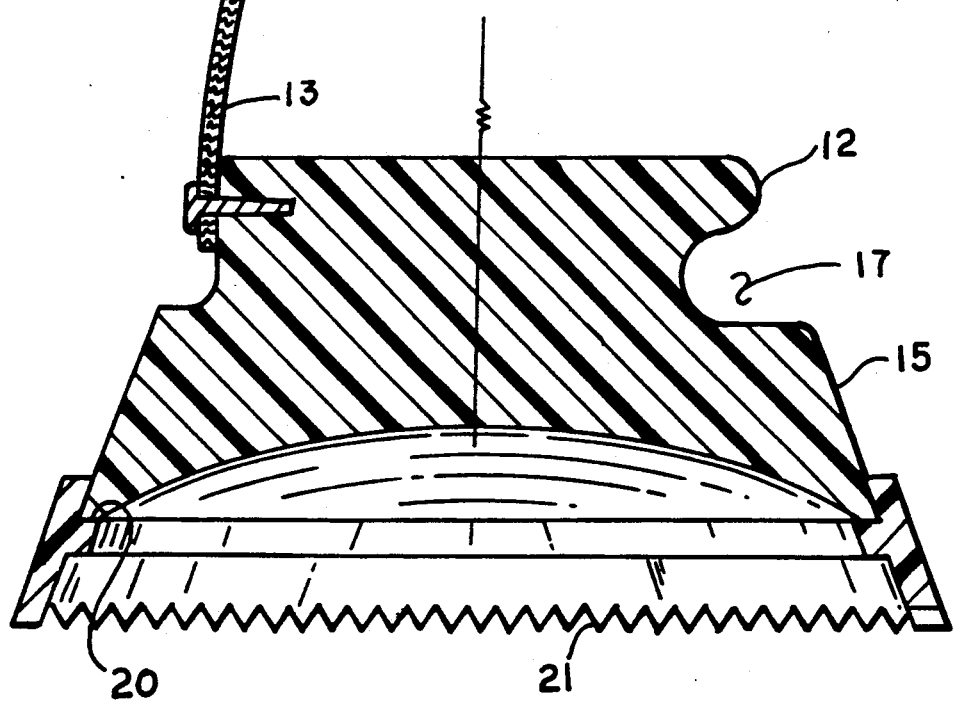
FIG. 4 is a cross-sectional illustration setting forth rotated side portions for illustration of various components in construction of the instant invention.
Figure 5:
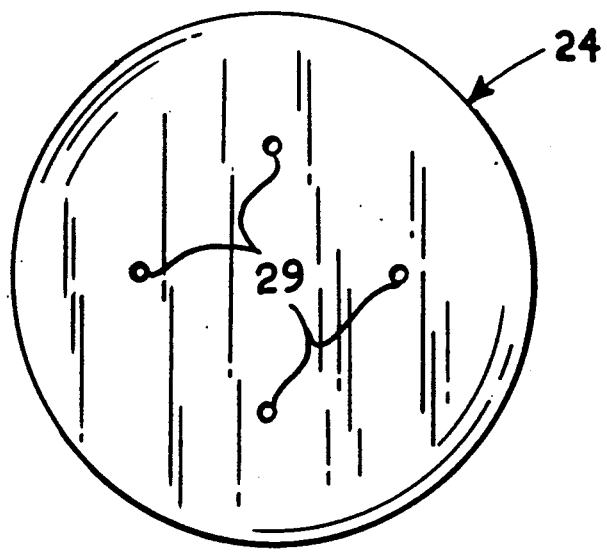
FIG. 5 is an orthographic top view of a modified scraping disk utilized by the instant invention.
Figure 6:
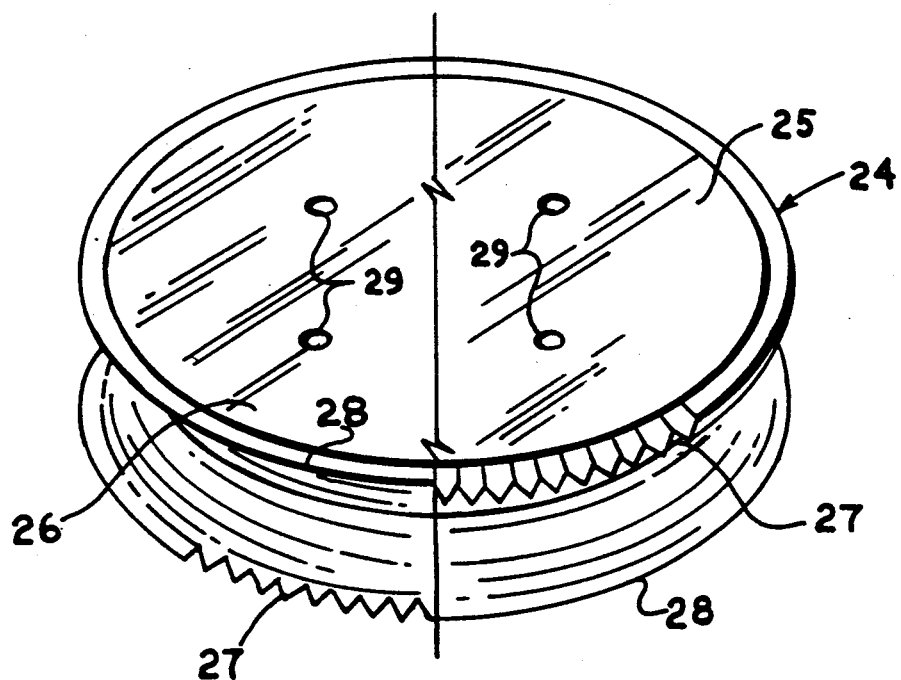
FIG. 6 is an isometric illustration of the modified scraping disk utilized by the instant invention.
Figure 7:
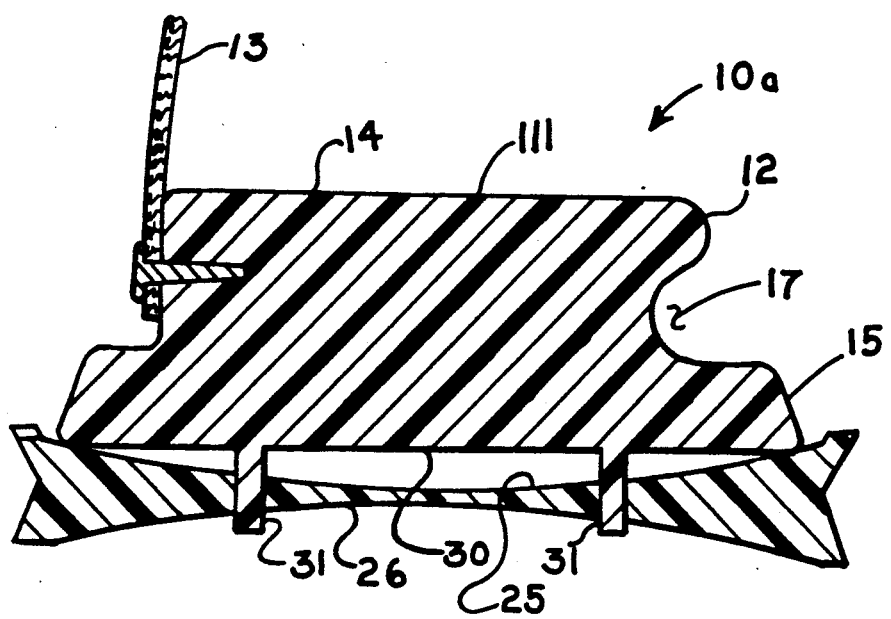
FIG. 7 is an orthographic cross-sectional illustration of the modification of the instant invention.

With reference now to the drawings, and in particular to FIGS. 1 to 7 thereof, a new and improved windshield scraping apparatus embodying the principles and concepts of the present invention and generally designated by the reference numerals 10 and 10a will be described.

More specifically, the windshield scraper apparatus 10 of the instant invention essentially comprises a unitary housing 11 formed with an upper portion 12, including a strap 13 diametrically and pivotally mounted to opposed sides of the upper portion 12. The organization includes a planar housing top surface 14 orthogonally oriented relative to a central axis 11a defined by the housing 11. A conical lower portion 15 is mounted coextensively to a lower end of the upper portion 12 at a junction 18, with a plurality of recesses 17 diametrically directed within the housing 11 at the junction 18. An annular continuous rigid scraping edge 16 defined as a lower terminal end edge of the lower wall portion 15 is orthogonally oriented relative to the axis 11a for scraping of snow and the like. For enhanced scraping capacity, a conical scraping ring 19 is provided, wherein the conical scraping ring 19 includes a conical configuration with a cylindrical mounting ledge 20 formed interiorly of the scraping ring 19 and arranged parallel to a torroidal top surface 19a of the scraping ring 19. The scraping ring includes a serrated scraping ring lower annular edge 21 that is also orthogonally aligned relative to the axis 11a.

A modification of the invention includes a scraping disk 24 (see FIGS. 5-7), wherein the scraping disk includes a concave disk top surface 25 and a concave disk bottom surface 26 (see FIG. 7), with the disk including a continuously serrated top annular edge 27 formed as a perimeter edge of the top surface 25, with a continuous circular bottom annular edge 28 formed as a perimeter edge of the bottom surface 26. In this manner, the disk 19 is reversibly mounted relative to a modified housing 111 that includes a matrix of plural pairs of securement rods 31 orthogonally mounted to a planar housing bottom wall 30 of the housing 111 that is parallel to the top surface 14. The rods 31 are received within plural pairs of securement bores 29 spaced apart a predetermined spacing equal to a predetermined spacing of the plural pairs of securement rods 31 to coaxially align the disk 19 in a reversible manner relative to the bottom wall 30 to present the serrated edge 27 or the continuous edge 28 to an automotive windshield to be scraped.

It should be noted that the recesses 17 permit enhanced manual grasping of the unitary housing where an individual positions a palm overlying the top surface 14 and grasps the housing by projecting an individual's fingers within one of the plurality of recesses 17. Circulatory motion of the scraping device provides enhanced removal of ice and snow from an associated windshield.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A windshield scraper apparatus comprising, in combination,
    a unitary housing, the unitary housing including an upper portion centered about a predetermined axis, with a conical lower portion coaxially and integrally mounted to a lower end of the upper portion, with the conical lower portion terminating in an annular rigid edge orthogonally oriented relative to the predetermined axis, and
    a flexible strap member pivotally and diametrically mounted to opposed sides of the upper portion, and
    the upper portion merging with the conical lower portion at a junction, and including a plurality of diametrically positioned recesses directed into the housing at the junction, and
    a planar housing top surface mounting a top portion of the upper portion, wherein the planar top surface is orthogonally oriented relative to the predetermined axis, and
    a ring member selectively securable adjacent the annular rigid edge, wherein the ring member includes a circular serrated edge peripherally positioned relative to the ring member for enhanced scraping and removal of ice and snow relative to an automotive windshield.

2. An apparatus as set forth in claim 1 wherein the ring means is defined by a scraping disk, the scraping disk includes a concave disk top surface and a concave disk bottom surface, and the scraping disk is securable coaxially aligned with the predetermined axis.

3. An apparatus as set forth in claim 2 wherein the concave disk top surface includes a continuously serrated top annular edge, and the disk bottom surface includes a continuous circular bottom annular edge, wherein the top annular edge and the bottom annular edge are arranged parallel relative to one another, and plural pairs of securement bores directed orthogonally through the scraping disk, and the lower portion includes a planar housing bottom wall arranged parallel to the planar housing top surface, wherein the planar housing bottom wall includes plural paris of securement rods spaced apart the predetermined spacing, wherein the securement rods are receivable within the securement bores for selective securement of the scraping disk to the unitary housing, and the securement bores are adapted for selective securement of the concave disk top surface and the concave disk bottom surface adjacent the housing bottom wall.

* * * * *